United States Patent
Iwase (10) Patent No.: US 7,236,210 B2
(45) Date of Patent: Jun. 26, 2007

(54) MULTI-CHANNEL VIDEO MIXER FOR APPLYING VISUAL EFFECTS TO VIDEO SIGNALS

(75) Inventor: Hiroyuki Iwase, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 464 days.

(21) Appl. No.: 10/664,777

(22) Filed: Sep. 17, 2003

(65) Prior Publication Data

US 2004/0150752 A1 Aug. 5, 2004

(30) Foreign Application Priority Data

Sep. 26, 2002 (JP) ............................. 2002-281010

(51) Int. Cl.
*H04N 9/74* (2006.01)
(52) U.S. Cl. ........................ 348/584; 348/705; 348/722
(58) Field of Classification Search ................ 348/722, 348/589, 570, 575, 578, 584, 594, 595, 705, 348/706; 386/52; 715/723
See application file for complete search history.

(56) References Cited

U.S. PATENT DOCUMENTS

| | | | | |
|---|---|---|---|---|
| 5,206,929 A | * | 4/1993 | Langford et al. | ............ 715/723 |
| 5,262,865 A | * | 11/1993 | Herz | .......................... 348/705 |
| 5,877,781 A | * | 3/1999 | Tomizawa et al. | .......... 345/531 |
| 2002/0118302 A1 | | 8/2002 | Iizuka et al. | |

* cited by examiner

*Primary Examiner*—Michael H. Lee
(74) *Attorney, Agent, or Firm*—Morrison & Foerster LLP (57) ABSTRACT

A digital video mixer apparatus is designed for inputting a video signal representative of a picture from a plurality of input channels, then processing the video signal to apply a visual effect to the picture, and outputting the processed video signal to an output channel. In the apparatus, a parameter value setting section includes a plurality of operators manually operable to set a plurality of parameter values used for applying a desired visual effect to the picture. A sequence control section sequentially feeds the parameter values in accordance with time progress of processing the video signal in order to vary with time the visual effect applied to the picture. A video signal processing section processes the video signal inputted from at least one of the input channels according to either of the parameter values set by the operators or the parameter values fed from the sequence control section.

7 Claims, 9 Drawing Sheets

SCREEN STARTING VISUAL EFFECT APPLICATION

SCREEN ENDING VISUAL EFFECT APPLICATION

FIG.9

MULTI-CHANNEL VIDEO MIXER FOR APPLYING VISUAL EFFECTS TO VIDEO SIGNALS

BACKGROUND OF THE INVENTION

1. Technical Field of the Invention

The present invention relates to an apparatus for applying visual effects to video signals, and a program for visual effect application. In particular, the present invention pertains to a video mixer apparatus for mixing video signals of multiple channels while applying a visual effect to each of the video signals to output a mixed video signal.

2. Prior Art

A video mixer apparatus mixes video signals of multiple input channels specified by a human operator of the video mixer apparatus to output a mixed video signal in real time. Upon this operation, the video mixer apparatus selects input channels, sets a mixing ratio among video signals of the multiple input channels, and sets a visual effect to be applied to each of the video signals of the respective input channels.

At the time of switching between input channels, the human operator may want to gradually change scenes from the preceding picture to the succeeding picture. A gradual change in brightness from the previous picture screen to the next picture screen is called a "crossfade."

Such a gradual change may be made not only at the time of changing screens, but also anytime the human operator wants to vary a visual effect with time.

To obtain such a visual effect, the human operator of the video mixer apparatus manually adjusts controls or operators. However, since simultaneous operation of multiple operators is an error-prone operation, some skill is required to manipulate the operators. Further, since the operators are operated manually, it is difficult to repeat the same operation of the operators.

Especially when video signals inputted in real time need to be outputted in real time, quick manipulation of the controls is required and this makes it very difficult to make a sudden change in visual effect.

As is known in the art, for example, as disclosed in the following patent document 1, a video mixer apparatus having a function for recording and reproducing scene data is also known. The conventional video mixer apparatus can record setting states of multiple operators, which are set at certain timing on an operation panel in a memory device as a set of scene data, so that the setting states of the multiple operators on the operation panel at the recording time can be read out from the memory device at any later time to reproduce by a single operation the setting states of the multiple operators.

The above-mentioned scene data recording and reproducing function can be used to change visual effects automatically.

However, since the scene data is handled as a single unit, the current set of operational states is changed as a whole promptly at the time of switching, or over a certain period of time.

In other words, it does not allow for recording and reproducing a gradual change in visual effect in a period of transition during which the visual effect gradually varies.

The above mentioned patent document 1 is Japanese patent unexamined publication No. 2002-262179. The United States patent application corresponding to Japanese patent unexamined publication No. 2002-262179 is laid open as US-2002-0118302-A1.

SUMMARY OF THE INVENTION

The present invention has been made to solve the above-mentioned problem, and it is an object thereof to provide a visual effect applying apparatus and a program for visual effect application, which make it easy to vary with time a visual effect applied with operators.

According to the invention, there is provided an apparatus for inputting a video signal representative of a picture from a plurality of input channels, then processing the video signal to apply a visual effect to the picture, and outputting the processed video signal to an output channel. In the inventive apparatus, a parameter value setting section includes a plurality of operators manually operable to set a plurality of parameter values used for applying a desired visual effect to the picture. A sequence control section sequentially feeds the parameter values in accordance with time progress of processing the video signal in order to vary with time the visual effect applied to the picture. A video signal processing section processes the video signal inputted from at least one of the input channels according to either of the parameter values set by the operators or the parameter values fed from the sequence control section.

This inventive structure makes them possible to vary the visual effect applied to the input video signal according to the operation of the operators and to vary with time the visual effect in the same manner according to the output of the sequence control section.

As a result, even when a video signal needs to be inputted in real time and a video signal applied with a predetermined visual effect needs to be outputted in real time, the visual effect can easily be varied without instant operation of the operators.

The video signal may be composed of video signals of multiple channels like in a video mixer apparatus. In this case, the video signal processing section processes each of the video signals of the multiple input channels according to some parameter values selected for each input channel from among the multiple parameter values set by the parameter value setting section, or some parameter values selected for each input channel from among the multiple parameter values outputted from the sequence control section, and mixes all the processed video signals to output a video signal applied with the predetermined visual effects.

Preferably in the inventive apparatus, the operators include a manual progression operator manually operable to input a desired operation amount in association with varying of the visual effect, so that the sequence control section controls the sequential feeding of the parameter values in response to the operation amount of the manual progression operator.

Therefore, a human operator can manually operate the manual progression operator to arbitrarily control the progress of the visual effect varying with time according to the amount of operation of the manual progression operator.

Preferably in the inventive apparatus, the operators include a skip operator that is operated to specify a time interval of updating the parameter values, so that the sequence control section sequentially updates the parameter values stepwise at the time interval specified by the skip operator.

Therefore, the human operator can manually operate the skip operator to arbitrarily control the smoothness or fineness of time variations of the visual effect.

Preferably in the inventive apparatus, the sequence control section has a memory for memorizing the parameter values set by the operators in accordance with a desired time progress, and reads out the parameter values in accordance with the time progress.

Therefore, the human operator can operate the operators to vary with the time the visual effect applied beforehand and have the sequence control section store it, thereby reproducing the same visual effect.

If stepwise timings stored during the time progress of the signal processing are few in number and the interval between the stepwise timings is long, for example, in the case where only parameter values at the first and last timings have been recorded, interpolation can be performed to output parameter values at finer timing intervals, thereby applying a visual effect varying finer with time.

In other words, the sequence control section has only to interpolate and output parameter values at multiple timings during the time progress of the signal processing according to the parameter values stored at multiple timings of recording.

Preferably in the inventive apparatus, the parameter value setting section has a plurality of operators in correspondence to a plurality of video signals inputted from a plurality of input channels and sets corresponding parameter values for the corresponding video signals by the corresponding operators, the sequence control section sequentially feeds the corresponding parameter values for the corresponding video signals, and the video signal processing section processes the corresponding video signals according to the corresponding parameter values which are either set by the corresponding operators or fed from the sequence control section. Further, the sequence control section has a memory for memorizing the corresponding parameter values set by operating the corresponding operators one by one, and sequentially reads out the memorized parameter values in accordance with the time progress.

Therefore, even if complicated operation of the operators is needed, like in the case where video signals of multiple input channels are processed and mixed to output a video signal applied with predetermined visual effects, the human operator can operate the operators a channel by channel basis to have the sequence control section store the operation results, thereby easily varying the visual effect with time by reproducing the recorded operation results.

According to the invention, there is provided a program for use in an apparatus having a processor for inputting a video signal representative of a picture from a plurality of input channels, then processing the video signal to apply a visual effect to the picture, and outputting the processed video signal to an output channel. The inventive program is executable by the processor for causing the apparatus to perform a method comprising the steps of operating a plurality of operators to set a plurality of parameter values used for applying a desired visual effect to the picture, sequentially feeding the set parameter values in accordance with time progress of processing the video signal in order to vary with time the visual effect applied to the picture, and processing the video signal inputted from at least one of the input channels according to either of the parameter values set by the operators or the sequentially fed parameter values.

The inventive program can run on a computer so that the computer executes the program to implement the visual effect applying apparatus.

DETAILED DESCRIPTION OF THE INVENTION

Figure 1:
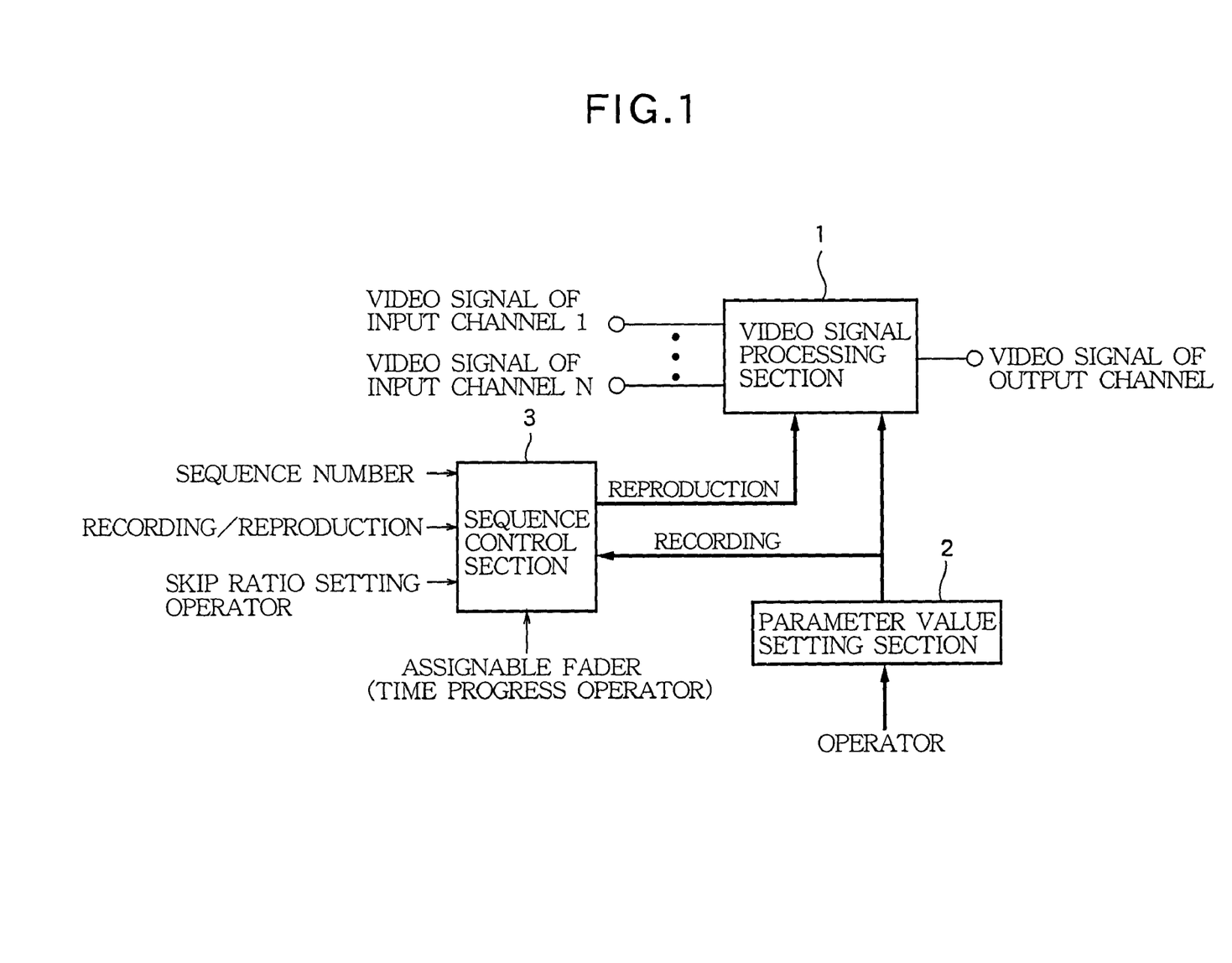
FIG. 1 is a block diagram for explaining an embodiment in which the present invention is applied to a video mixer apparatus.

FIG. 1 is a block diagram for explaining an embodiment in which the present invention is applied to a video mixer apparatus.

The video mixer apparatus prestores as sequence data setting states of parameters varied by a human operator who adjusts operators as time progresses. The video mixer apparatus can read the recorded sequence data at any later time to reproduce the operating procedure for control of the operators. This makes it easy to control a complicated visual effect varying with time.

As shown, reference numeral 1 designates a video signal processing section, reference numeral 2 is a parameter value setting section, and reference numeral 3 is a sequence control section. Unlike conventional video mixer apparatuses, the video mixer apparatus of the present invention has the sequence control section 3 to expand its visual effect features.

The video signal processing section 1 takes in video signals of multiple input channels, and processes each of the video signals according to parameter values selected for each channel from among multiple parameter values set by the parameter value setting section 2. The video signal processing section 1 then mixes (synthesizes) the processed video signals to output a composite video signal applied with a predetermined visual effect.

Alternatively, the video signal processing section 1 may perform signal processing according to multiple parameter values outputted from the sequence control section 3, and mix the processed video signals to output a composite video signal applied with a predetermined visual effect.

The mixing process is performed by setting signal paths as described later with reference to FIG. 3.

The video signals of the multiple input channels are those from external video equipment such as a video camera, a video tape recorder, a DVD (Digital Versatile Disk), or a personal computer. Further, the video picture may be motion picture or still picture.

On the other hand, the video signal from an output channel can be fed to a television receiver, a projector, a personal computer, and so on. In the example of FIG. 1, the number of output channels is one, but another channel may also be provided, such as a channel for an operator's monitor, for outputting a mixed signal different from that of the output channel.

If the apparatus has a built-in memory, the apparatus may read inputs from the memory and write to the memory outputs after subjected to video signal processing.

The parameter value setting section 2 sets multiple parameter values for applying a predetermined visual effect to each picture on the display screen according to the operation of multiple operators.

As will be described later with reference to FIG. 3, the visual effect may be an effect relating to picture quality such as picture level or color, or an effect relating to the arrangement of an image, such as the length and width measurements of the screen and the arrangement of the image on the display screen.

Some channel-specific operators are provided for respective input channels 1 to N, and according to the operation of the channel-specific operators, the parameter setting section 2 sets parameter values for respective video signals of these input channels.

There may also be provided a crossfader specifying a synthesis ratio between two input channels or a master fader applying a visual effect to a synthesized video signal of the output channel.

On the other hand, the sequence control section 3 has a sequence data reproduction function for outputting the multiple parameter values at multiple timings according to the time progress of the signal processing to vary with time the visual effect applied to the picture on the display screen. The sequence data may be preset in a memory section, or calculated using a certain function.

Figure 3:
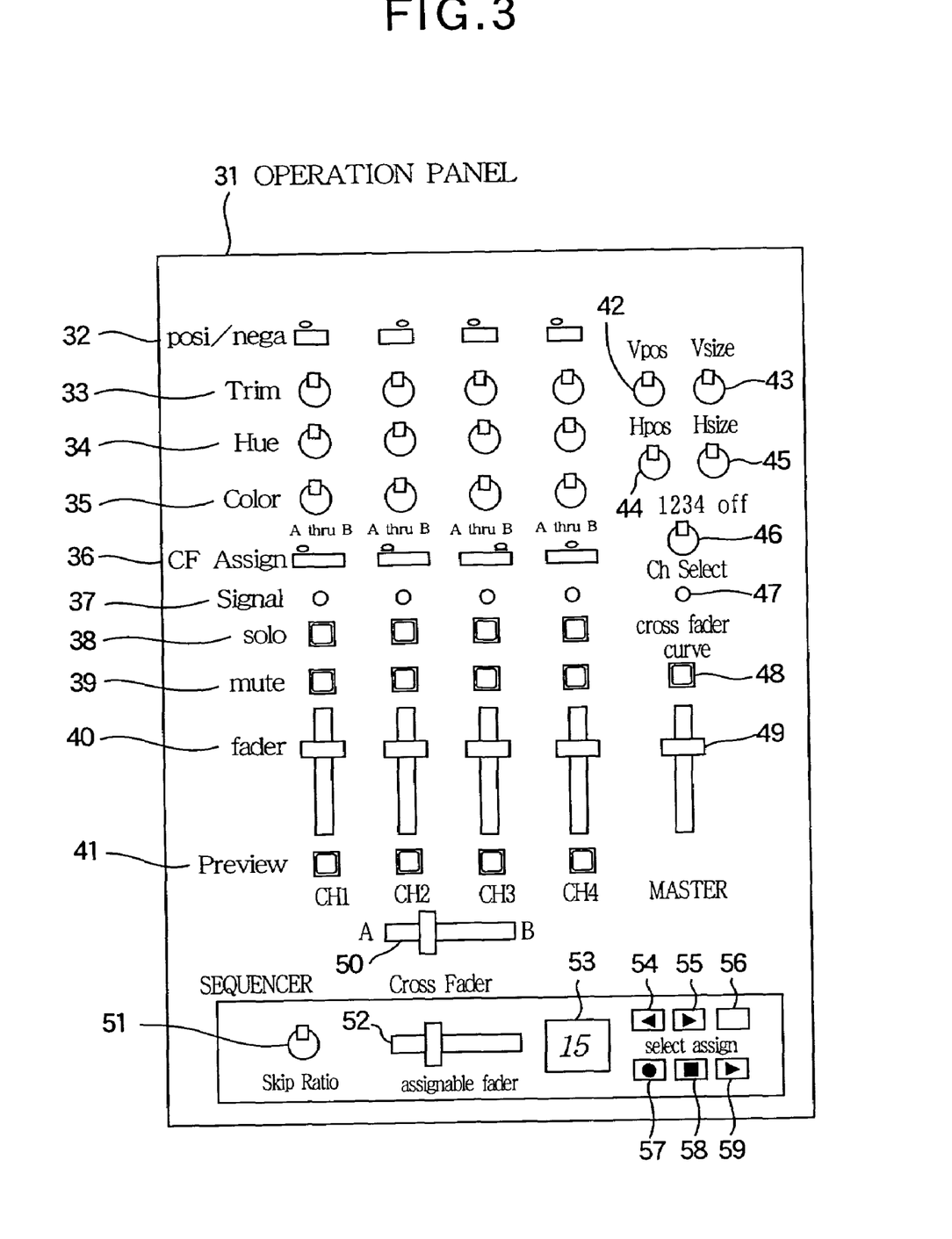
FIG. 3 is an illustration showing an example of an operation panel according to the embodiment of the present invention.

The sequence control section 3 controls the time progress of the signal processing according to the amount of operation of a manual progression operator (assignable fader 52 in FIG. 3).

During the time progress of the signal processing, multiple parameter values set according to predetermined operators are ganged together and collectively controlled.

It allows the stored multiple parameters to be handled as if they were assigned to the manual progression operator alone, and allows the sequence data of the recorded parameters to be reproduced according to the operation of the manual progression operator. Namely, the operators include a manual progression operator manually operable to input a desired operation amount in association with varying of the visual effect, so that the sequence control section 3 controls the sequential feeding of the parameter values in response to the operation amount of the manual progression operator.

Instead of the manual operation, it is also possible to control the time progress automatically with a predetermined speed or a variation curve.

Further, the multiple parameter values may be updated at certain timings to determine the roughness or fineness of the reproduction of the sequence data with a skip operator (skip ratio switch 51 in FIG. 3) so that the interval between update timings can be controlled. This makes it possible to create a visual effect changing stepwise at intervals as well as smoothly changing visual effects. Namely, the operators include a skip operator that is operated to specify a time interval of updating the parameter values, so that the sequence control section 3 sequentially updates the parameter values stepwise at the time interval specified by the skip operator.

The sequence control section 3 may also have a function for recording sequence data to store the multiple parameter values in the memory section.

In this case, for example, the multiple parameter values set by the parameter value setting section 2 according to the operation of multiple operators are stored in real time according to the time progress of the processing. Upon reproducing the sequence data, the stored multiple parameter values are read out one by one according to the time progress of the signal processing. Namely, the sequence control section 3 has a memory for memorizing the parameter values set by the operators in accordance with a desired time progress, and reads out the parameter values in accordance with the time progress.

Alternatively, the parameters may be recorded with the operation of certain operators while halting the progress every timing step of recording.

Although at least one kind of sequence data can thus be recorded, plural patterns of sequence data may be recorded so that the recorded patterns can be switched to realize a variety of visual effects with split-second timing.

The sequence control section 3 is not limited to recording simultaneously operating states of all the operators. It can use an overdubbing technique to record sequence data divided over multiple times, to synthesize the divided parts of recorded sequence data, and to reproduce the synthesized sequence data.

For example, in response to the operation of some operators selected for each channel from among multiple operators, parameter values set for a video signal of the input channel are recorded, and the recording process is repeated according to the time progress of the signal processing. In this case, multiple parameter values for applying a certain visual effect to a picture on a display screen created by each video signal of the multiple input channels are recorded sequentially.

If parameter values for a channel are written over the previous parameter values of the same channel, the previous parameter values will be deleted. However, the manner of how to rewrite the previous parameters may be changed to write the results of adding or subtracting the new parameter values to or from the previous parameter values, thereby applying a more complicated visual effect.

Especially, as will be described later with reference to FIG. 3, common operators 42 to 45 cannot apply the same visual effect to video signals of multiple input channels at the same time.

However, the sequence control section 3 can repeat processing for recording parameter values to be set for each video signal of the multiple channels in response to the operation of the common operators 42 to 45 according to the time progress of the signal processing, so that the multiple parameter values for applying a predetermined visual effect to a picture created by each video signal can be recorded by overlaying one set of parameter values on another.

Namely, the parameter value setting section 2 has a plurality of operators in correspondence to a plurality of video signals inputted from a plurality of input channels and sets corresponding parameter values for the corresponding video signals by the corresponding operators. The sequence control section 3 sequentially feeds the corresponding parameter values for the corresponding video signals. The video signal processing section 1 processes the corresponding video signals according to the corresponding parameter values which are either set by the corresponding operators or fed from the sequence control section 3. The sequence control section 3 has a memory for memorizing the corresponding parameter values set by operating the corresponding operators one by one, and sequentially reads out the memorized parameter values in accordance with the time progress.

If use of only the sequence data recorded at multiple timings in the time progress of the signal processing is not enough to make a time-varying visual effect smooth because the timing intervals are too long, the sequence control section 3 may interpolate the parameter values recorded at the multiple timings in the time progress of the signal processing based on the recorded parameter values.

For example, this interpolation is effective when only the parameter values corresponding to operating states of operators only at the start and end points of the time span during which a visual effect is being applied have been recorded.

The video signal processing section 1, the parameter value setting section 2, and the sequence control section 3 may be housed in a video mixer apparatus, or the video signal processing section 1 may be provided as an equipment component separately from the parameter value setting section 2 and the sequence control section 3. A personal computer can also be so connected that multiple virtual operators are displayed on a monitor screen of the computer and operated with a keyboard and a mouse to control the video signal processing section 1.

To control the video signal processing section 1 on the personal computer, the actuation of each operator is made remotely controllable, for example, with a MIDI control change, to transfer sequence data to the video signal processing section 1 using a file format such as SMF (Standard MIDI File).

Figure 2:
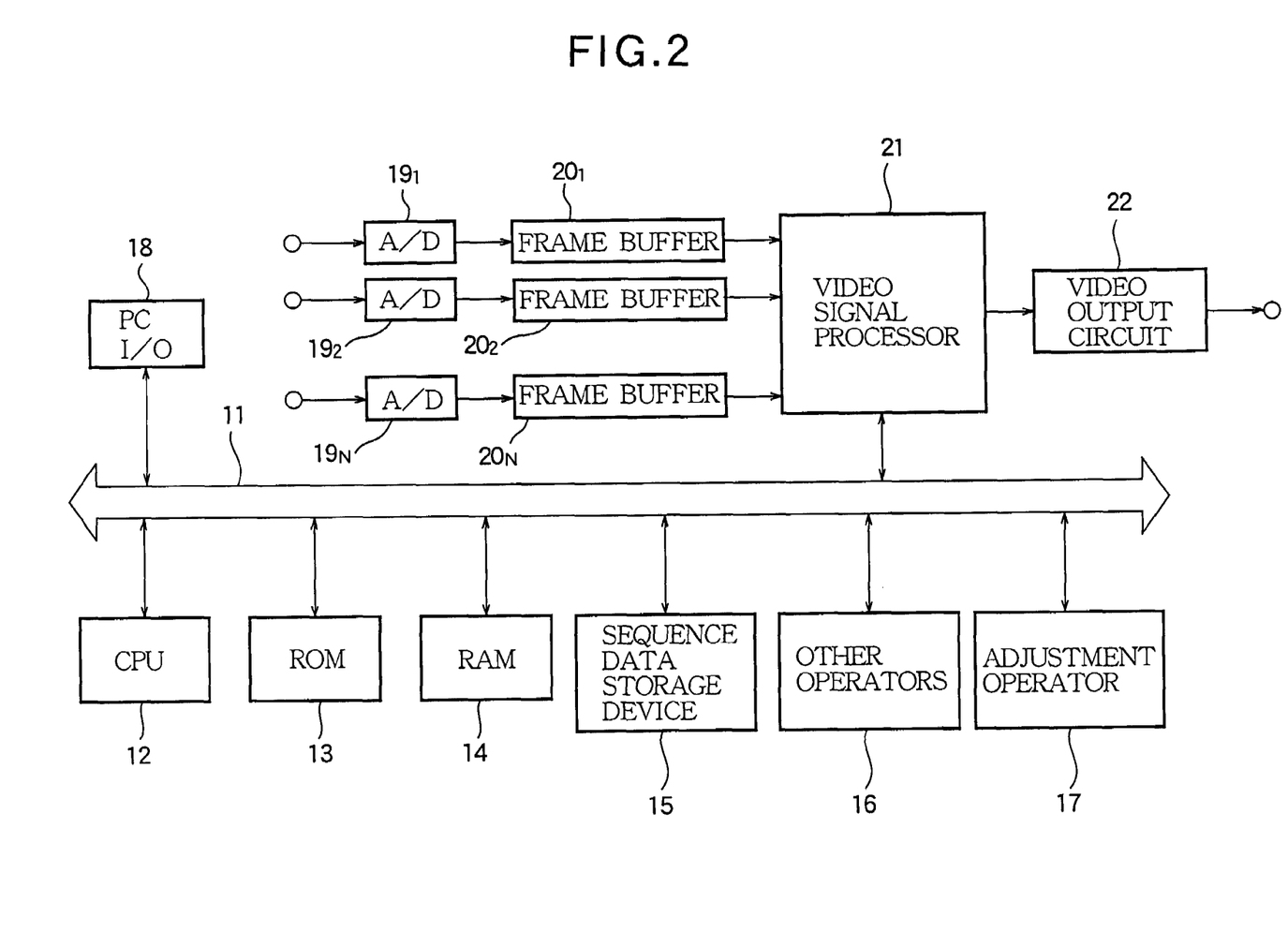
FIG. 2 is a block diagram showing an exemplary hardware setup of the embodiment of the present invention.

FIG. 2 is a block diagram showing an exemplary hardware setup of an embodiment of the present invention.

In the diagram, a CPU 12 executes an operating program and control program with using various kinds of setting data stored in the ROM 13, and uses a RAM as a work area to control the operation of the video mixer apparatus.

To be more specific, the CPU detects events of an adjustment operator 17 and other operators 16 on an operator panel through a bus 11 to set parameter values in a video signal processor 21 so as to control processing for applying a visual effect and mixing video signals.

The writing and reading of sequence data can be performed by storing it in a sequence data storage device 15 such as a flash memory, or by downloading it to the sequence data storage device 15 from an external apparatus via an interface 18.

Analog/digital converters $19_1$ to $19_N$ (digital video decoders) are connected to the video signal processor 21 through frame buffers $20_1$ to $20_N$, respectively.

The analog/digital converters $19_1$ to $19_N$ convert analog composite signals (video signal, color burst, composite synchronizing signal) to digital composite signals. Upon conversion, a video signal is separated into a luminance component (Y signal), and two chrominance components or a color difference signal (Cb signal) and a color difference signal (Cr signal).

Since video signals of multiple input channels 1 to N are not synchronized with one another, they are stored in the respective buffers 201 to 20N and synchronized so that they will be synchronously outputted to the video signal processor 21.

The video signal processor 21 is for example a DSP (Digital Signal Processor). The video signal processor 21 selects any video signals inputted with respective parameter setting values and mixing signal paths set by the CPU 12, mixes and outputs the selected video signals in real time.

A video output circuit (digital video encoder) 22 generates an analog composite signal from the Y, Cr, and Cb signal components of the video signal outputted from the video signal processor 21, and outputs an analog composite signal to a video display apparatus to display a screen corresponding to the output video signal.

The bus 11 has an interface (PC/IO) 18 for connection to an external personal computer and the like. The external personal computer creates operators on its monitor screen to allow the human operator to control the operators through a GUI with a keyboard and a mouse, and control the video signal processor 21 in the same manner as the CPU 12.

If the ROM 13 is a flash memory, the control program and setting data stored in it can be rewritten in the same manner as in the sequence data storage device 15. A new control program and setting data may also be installed from an external storage device (such as a memory card or a CD-ROM), not shown, through the interface 18, or downloaded from a server computer on a network through the interface 18.

The contents of setting states of parameter values or sequence data may be displayed on a monitor, not shown, or overlaid on the same monitor screen for displaying the video signal output.

FIG. 3 is an illustration showing an example of an operation panel 31 according to the embodiment of the present invention.

In FIG. 3, reference numerals 32 to 35, and 40 designate parameter operators, each set of parameter operators corresponding to each input channel. The parameter operator 32 is a positive/negative selection switch. The parameter operators 33 to 35 are rotary volumes, that is, a trim volume 33 (common gain volume for Y and C), a hue control volume 34, a color gain (intensity of hue) volume 35, and a fader (slider) 40 for setting common gain for Y and C. Reference numeral 37 designates an LED (light-emitting diode) that lights up when a video signal has appeared in each input channel.

Reference numerals 42 to 45 are common operators, each of which is in the form of a rotary volume. The common operator 42 is a vertical position volume for setting the vertical position of a display screen image created by an input video signal, the common operator 43 is a vertical size volume for setting the vertical screen size, the common operator 44 is a horizontal position volume for setting the horizontal position of a display screen image created by an input video signal, and the common operator 45 is a horizontal size volume for setting the horizontal screen size.

In operation, the human operator specifies an input channel by tuning a channel selection switch 46, and sets parameters corresponding to the selected input channel with the operation of the common operators 42 to 45.

If the human operator selects the "off" position for the channel selection switch 46, since it is changed to a preset select function which allows the human operator to preset the arrangement of an image, the human operator sets preset states with the common operators 42 to 45. The common operators 42 to 45 may be replaced by separate sets of operators, each set exclusively provided for respective adjustments to each channel.

Reference numeral 49 designates an operator for adjusting the output level of a mixed video signal. As shown, the operator 49 is a main fader in this example. Reference numeral 47 designates an LED (light-emitting diode) that lights up when a video signal has appeared in the output channel.

Reference numeral 38 designates a set of solo switches, each of which is provided corresponding to each input channel. Pushing one solo switch 38 causes only a video signal corresponding to the input channel to be applied with a visual effect and supplied to the output channel (Main Out).

Reference numeral 39 designates a set of mute switches, each of which is provided corresponding to each input channel. Each mute switch 39 prevents the supply of a video signal corresponding to each input channel to the output channel (Main Out).

Reference numeral 41 designates a set of preview switches, each of which is provided corresponding to each input channel. Each preview switch 41 supplies a video signal corresponding to each input channel to another output channel (Preview Out) to output the same to the human operator's monitor display. For example, the preview switch 41 is used for displaying a video signal the human operator intends to newly mix. In this case, the preview switch 41 may be so set that, even when the level of the video signal of this input channel has been reduced to zero with the corresponding fader 40 (to prevent the video signal from being outputted to the Main Out), the video signal will be outputted at a reference level.

A crossfader 50 synthesizes video signals of channels assigned to either "A Input" or "B Input" while setting their mixing ratio (0 to 1).

Reference numeral 36 designates a set of crossfader assign switches, each of which is provided corresponding to each input channel. These crossfader assign switches are used to assign the input channels to "A Input," or "B Input," or "Through" if any.

Reference numeral 48 designates a crossfader curve switch for switching among variation curves of mixing ratios for the crossfader 50. A different curve is set each time this switch is pushed. Each variation curve determines a functional relation between the position of the knob of the crossfader 50 and the mixing ratio.

Arranged in a box on the bottom are operators for implementing sequence control features.

Select switches 54 and 55 are to change the current sequence number (indicated on an indicator 53), and a newly selected sequence number is confirmed by pressing an assign button 56. Reference numerals 57, 58, and 59 designate a record switch, a stop switch, and an automatic play switch, respectively.

Reference numeral 52 designates an assignable fader. Sliding the knob of the assignable fader 52 when the automatic play switch 59 is off causes a synchronous reading of multiple parameters included in sequence data. In this case, if the operation panel is such that the knobs of the faders 40, 49, and the crossfader 50, and the positive/negative selection switches 32 and the crossfader assign switches 36 are all motor-driven to operating positions corresponding to the read parameters, the operation panel can sift to the manual operation mode immediately upon completion or interruption of the time progress of the sequence data.

The rotary volume type operators 33 to 35, and 42 to 45 may also be motor-driven. If these operators are of the rotary encoder type that controls parameter values according to the variations of rotation angles, an LED level meter may be provided around each operator's knob so that a value of the level meter will correspond to a read parameter value.

A skip ratio switch 51 sets reading intervals for updating the sequence data at the time of automatic playing or manually advancing the sequence data to control the roughness or fineness of a reproduced visual effect. The operator 51 may be a skip ratio switch for gradually changing its skip ratio.

Figure 4:
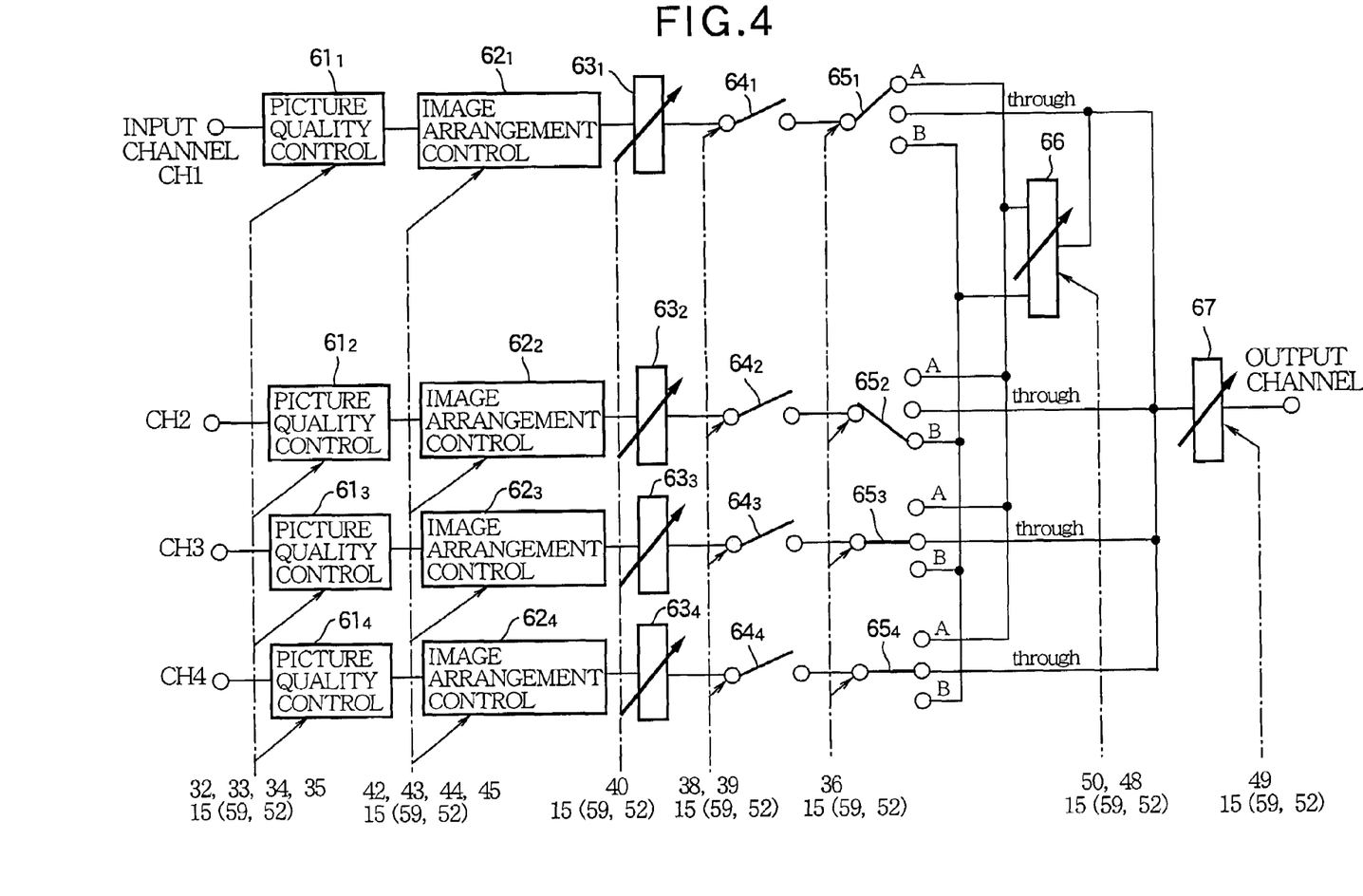
FIG. 4 is a diagram for explaining signaling paths according to the embodiment of the present invention.

FIG. 4 is a diagram for explaining signaling paths according to the embodiment of the present invention.

The following elements represent the features of the video signal processing section 1 of FIG. 1 and the video signal processor 21 as an equivalent electric circuit. The number of input channels is four, and with the omission of the preview output channel, the number of output channels is one.

Reference numerals $61_1$ to $61_4$ designate picture quality controls for adjusting the quality of pictures of the first to fourth input channels. The picture quality controls are controlled by the parameters set according to the operation of respective channel-specific operators, namely the positive/negative selection switches 32, the trim volumes 33, the hue control volumes 34, and the color gain volumes 35 shown in FIG. 3, or based on the sequence data read out of the sequence data storage device 15 shown in FIG. 2 according to the operation of the assignable fader 52.

Reference numerals $62_1$ to $62_4$ designate image arrangement controls for adjusting the arrangement of images of the first to fourth input channels. The image arrangement controls are controlled by the parameters set according to the operation of the operators of the vertical position volume 42, the vertical size volume 43, the horizontal position volume 44, and the horizontal size volume 45 shown in FIG. 3, or based on the sequence data read out of the sequence data storage device 15.

Reference numerals $63_1$ to $63_4$ designate gain controls, which are controlled by the parameter set according to the operation of the fader 40 shown in FIG. 3. or based on the sequence data read out of the sequence data storage device 15.

Reference numerals $64_1$ to $64_4$ designate on/off control switches determining if video signals passed through the gain controls $63_1$ to $63_4$ should be outputted. The on/off control switches are controlled by the solo switches 38 and the mute switches 39 shown in FIG. 3, or based on the sequence data read out of the sequence data storage device 15.

Reference numerals $65_1$ to $65_4$ designate switches selecting paths assigned to a cross gain control 66 from the respective input channels 1 to 4. Each switch selects one of "A Input," "B Input," and "Through" for each video signal. The switches are controlled with the operation of the crossfader assignable switch 36 shown in FIG. 3, or based on the sequence data read out of the sequence data storage device 15.

A connection of video signal inputs via "A Input," "B Input," and "Through" denotes that they are added and synthesized.

The cross gain control 66 synthesizes two video signals assigned to "A Input" and "B Input" by assigning them weights varying in directions opposite to each other. The cross gain control is controlled with the crossfader 50 shown in FIG. 3, or based on the sequence data read out of the sequence data storage device 15. The variation characteristics of the cross gain control are controlled with the crossfader curve switch 48 shown in FIG. 3. or based on the sequence data read out of the sequence data storage device 15. A connection between the output of the cross gain control and the "Through" output of each input channel denotes that they are added and synthesized.

Reference numeral 67 designates a main gain control, which is controlled with the main fader 49 shown in FIG. 3, or the sequence data read out of the sequence data storage device 15.

Figure 5:
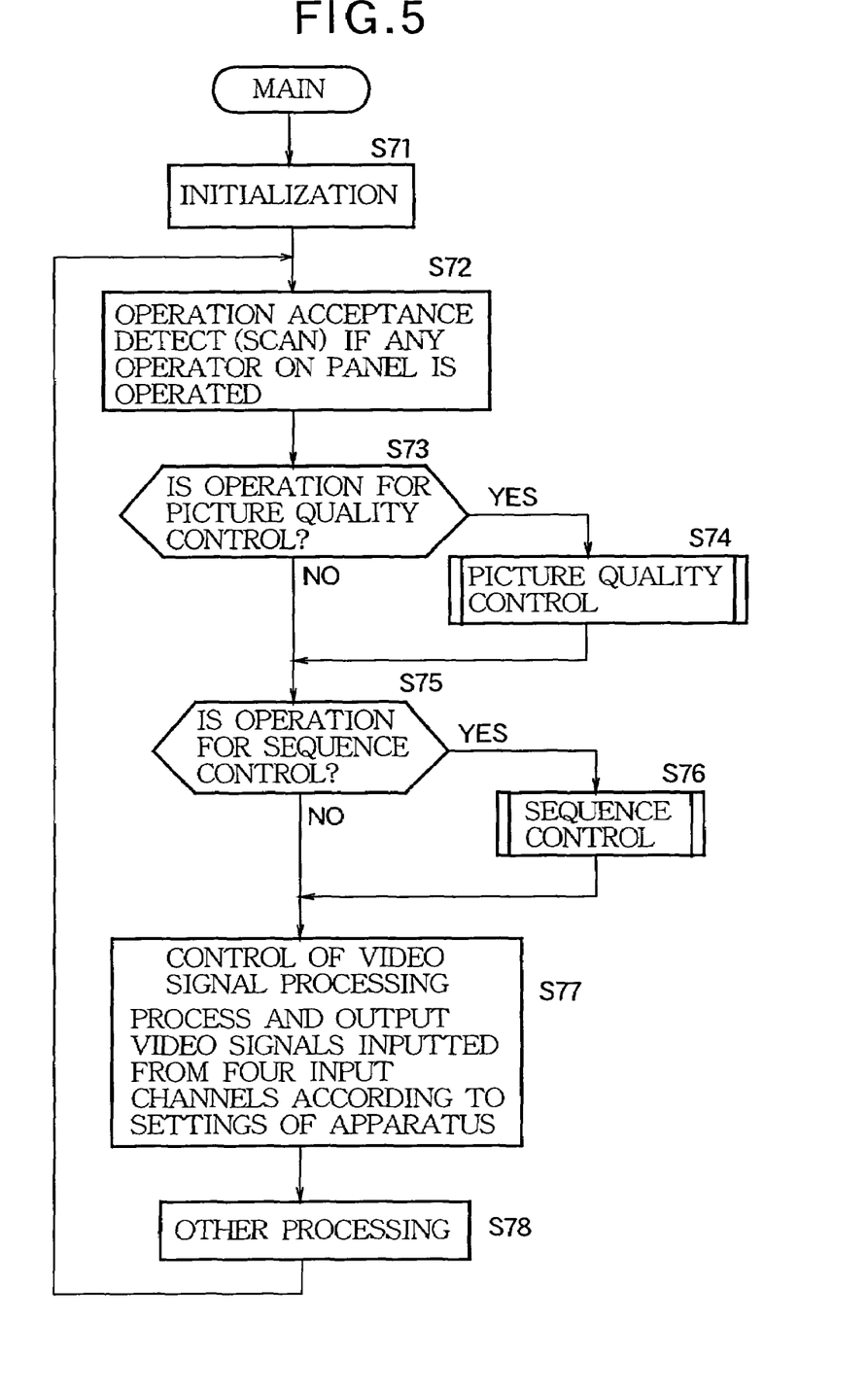
FIG. 5 is a flowchart showing the main routine of exemplary operation of the embodiment of the present invention.

FIG. 5 is a flowchart showing the main routine of exemplary operation of the embodiment of the present invention.

When the video mixer apparatus is powered on, it is initialized in step S71, and operating states of multiple operators on the operation panel 31 are detected in step S72.

Figure 6:
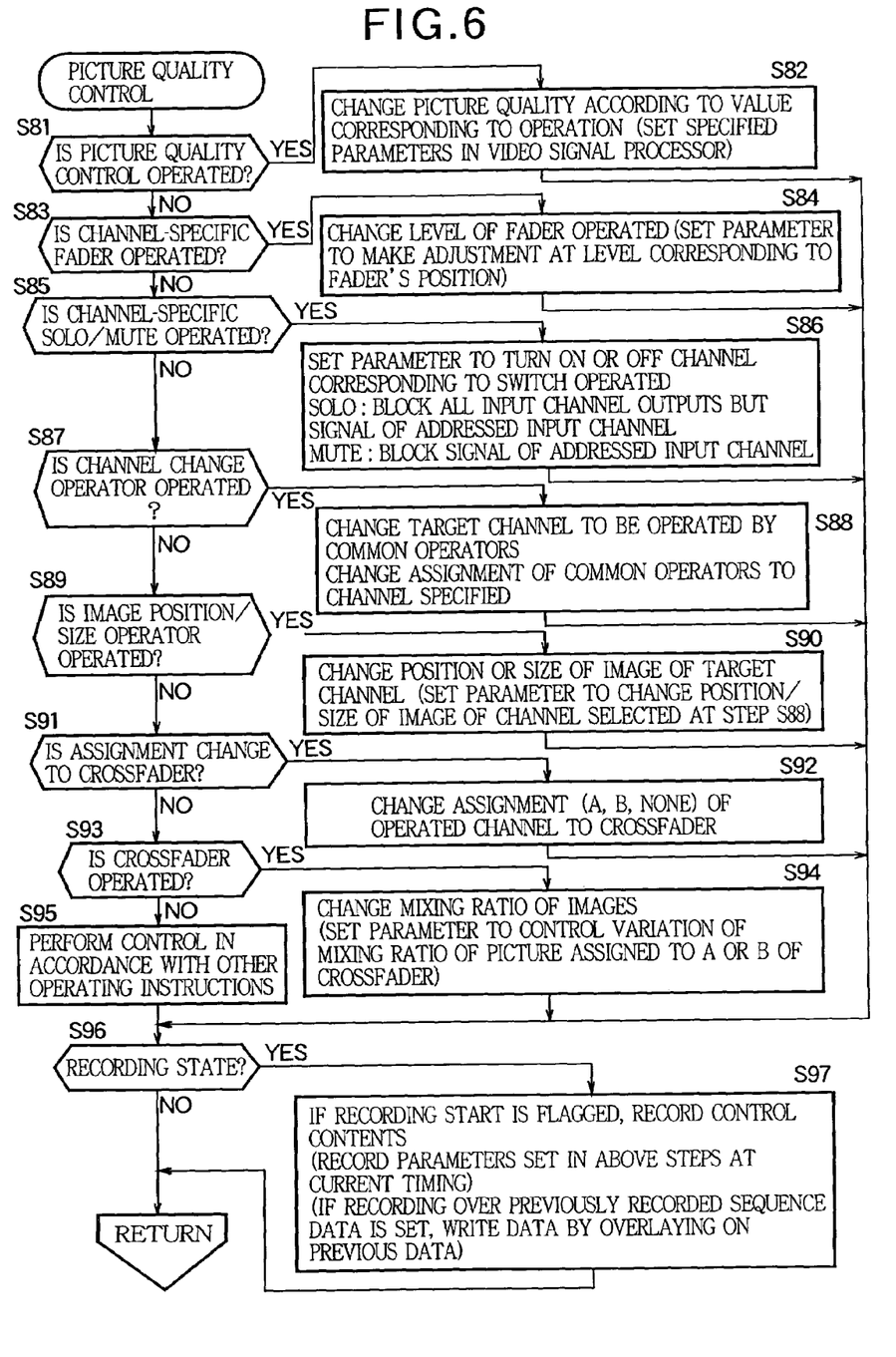
FIG. 6 is a flowchart showing the details of picture quality control processing performed in step S74 of FIG. 5.

If any operation for picture quality control is detected in step S73, the main routine goes to step S74 (FIG. 6), or if any operation for sequence control is detected in step S75, it goes to step S76 (FIG. 6).

Processing of video signals is controlled in step S77, and other processing is performed in step S78. After that, the main routine returns to step S72.

FIG. 6 is a flowchart showing the details of picture quality control processing performed in step S74 of FIG. 5. In steps S81 to S94, parameter values are set according to the operation of the operators. It is then judged in step S96 whether it is sequence data recording state and whether a sequence start flag is set.

If yes, parameter values processed in steps S82, S84, S86, S90, and S94 are recorded in step S97 at current timing. If recording over sequence data of a previously recorded sequence number is set, the data is written by overlaying it on the previous sequence data (overwriting or adding), thus performing complicated sequence control.

Figure 7:
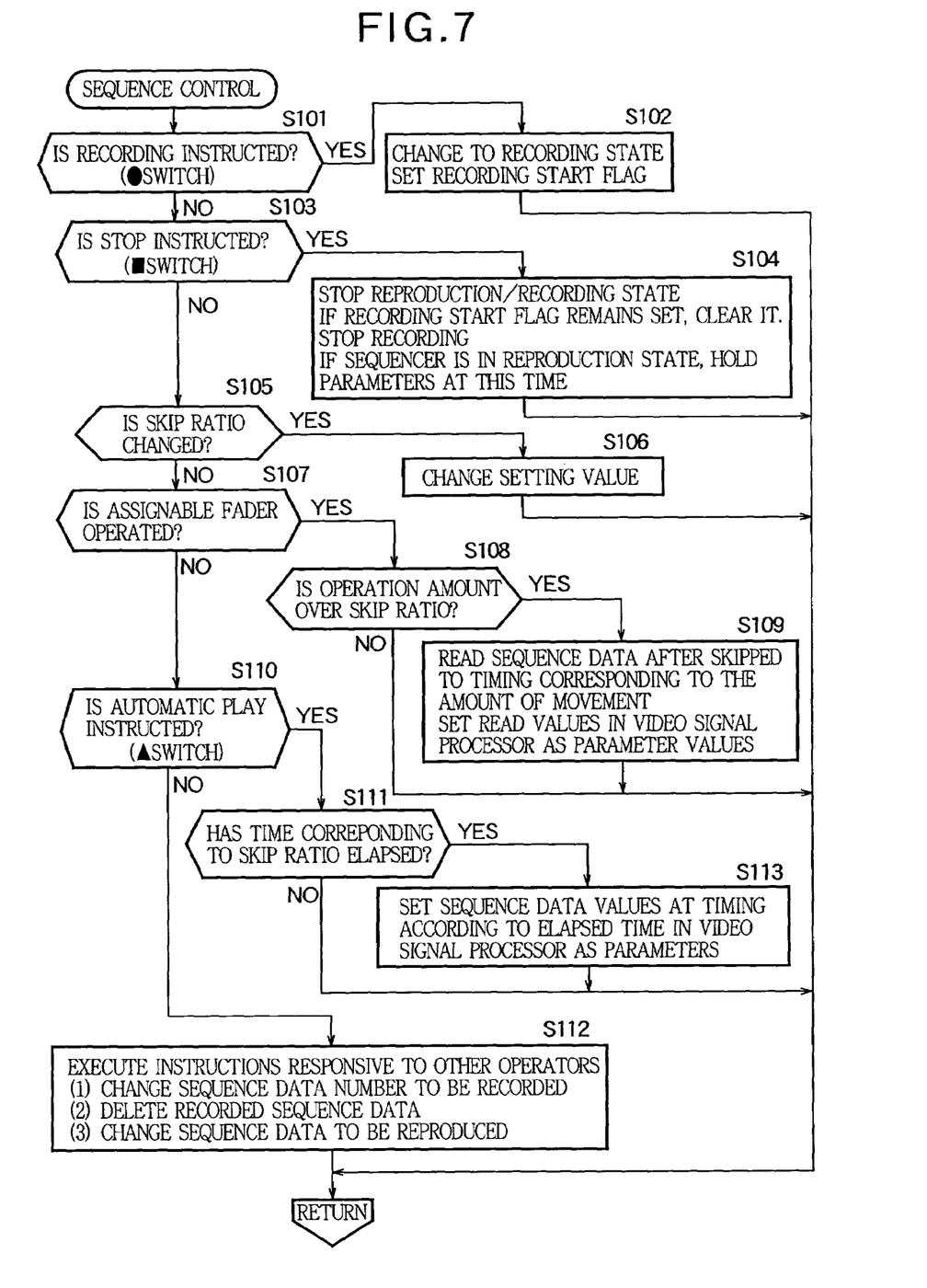
FIG. 7 is a flowchart showing the details of sequence control processing performed in step S76 of FIG. 5.

FIG. 7 is a flowchart showing the details of sequence control processing performed in step S76 of FIG. 5.

In step S101, if operation of the record switch (57 in FIG. 3) is detected, a record start flag is set in step S102.

Then, if operation of the stop switch (58 in FIG. 3) is detected in step S103, both the recording and reproduction of sequence data are stopped in step S104. If stop of recording is required, the recording start flag is cleared. If stop of reproduction is required, the parameter values are held at this time. The parameter values are updated with the operation of the picture quality controls shown in FIG. 6.

In step 105, if operation of the skip ratio switch (51 in FIG. 3) is detected, the setting value is changed in step 106. The setting value is to set the number of times the sequence data is read or timing intervals in the progress of the sequence. A nonskipping state is also selectable.

Then, in step S107, if operation of the assignable fader (52 in FIG. 3) is detected, the execution procedure goes to step S109 only when it is determined in step S108 that the amount of operation exceeds the skip ratio. In step 109, the sequence data is read out after skipped to timing corresponding to the amount of movement of the skip ratio switch. The read-out parameter value is set in the video signal processor (21 in FIG. 2, and see FIG. 3).

It is judged in step S108 whether a value corresponding to the amount of movement from the operator's position at which the previous parameter value has been changed exceeds the skip ratio value. A specific example of this will be described later with reference to FIGS. 8 and 9.

Then, in step S110, if operation of the automatic play switch (59 in FIG. 3) is detected, the execution procedure goes to step S113 only when it is determined in step S111 that the amount of operation corresponds to the skip ratio. In step 113, sequence data values are set in the video signal processor (21 in FIG. 2, and see FIG. 4) at timings according to the time progress.

A specific example of this will be described later with reference to FIG. 10.

In step S112, instructions responsive to other operations are executed. For example, a sequence number of sequence data to be recorded or reproduced is changed or the previously recorded sequence data is deleted with the operation of the select switches 54, 55, and the assign button 54.

Figure 8:
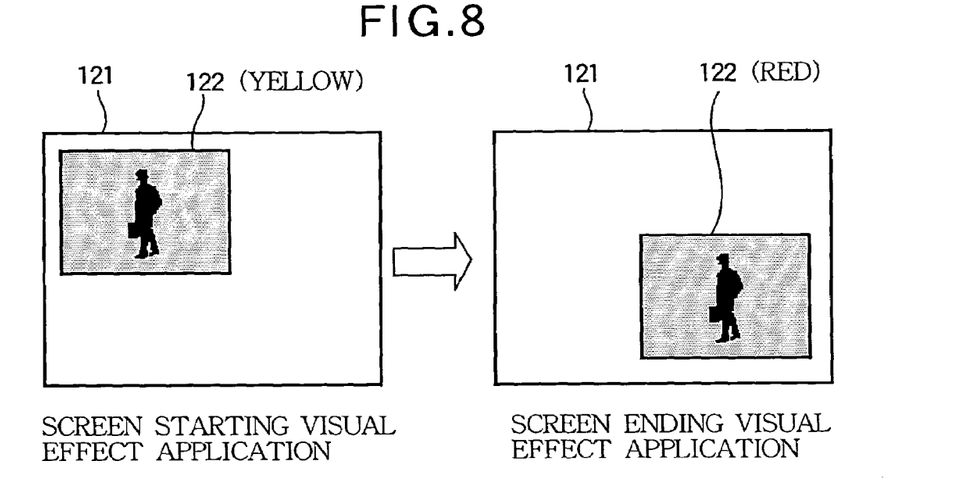
FIG. 8 is an illustration showing a specific example of a visual effect.

FIG. 8 is an illustration showing a specific example of a visual effect.

Reference numeral 121 designates a full screen on the monitor. The full screen on the left carries an image at the start time of visual effect application, and the full screen on the right carries an image at the end time of the visual effect application.

For example, the full screen on the left carries a screen image 122 created from a video signal of input channel 1. In this case, yellow is emphasized with the operation of the hue control volume (Hue) 34 in FIG. 3. Further, the screen image 122 is set with the operation of the vertical position volume 42, the vertical size volume 43, the horizontal position volume 44, and the horizontal size volume 45 such that its center is put in a position about one-quarter from the top of the full screen 121 with a vertical size corresponding to one-half of the full screen 121, and about one-quarter from the left of the full screen 122 with a horizontal width corresponding to one-half of the full screen 121.

On the other hand, the full screen on the right carries another screen image 122 created from a video signal of input channel 1. In this case, red is emphasized with the operation of the hue control volume (Hue) 34 in FIG. 3. Further, the screen image 122 is set with the operation of the vertical position volume 42 and the horizontal position volume 44 such that its center is put in a position about three-quarters from the top and left of the full screen 121 with the same vertical and horizontal widths as those of the left screen image.

Figure 9:
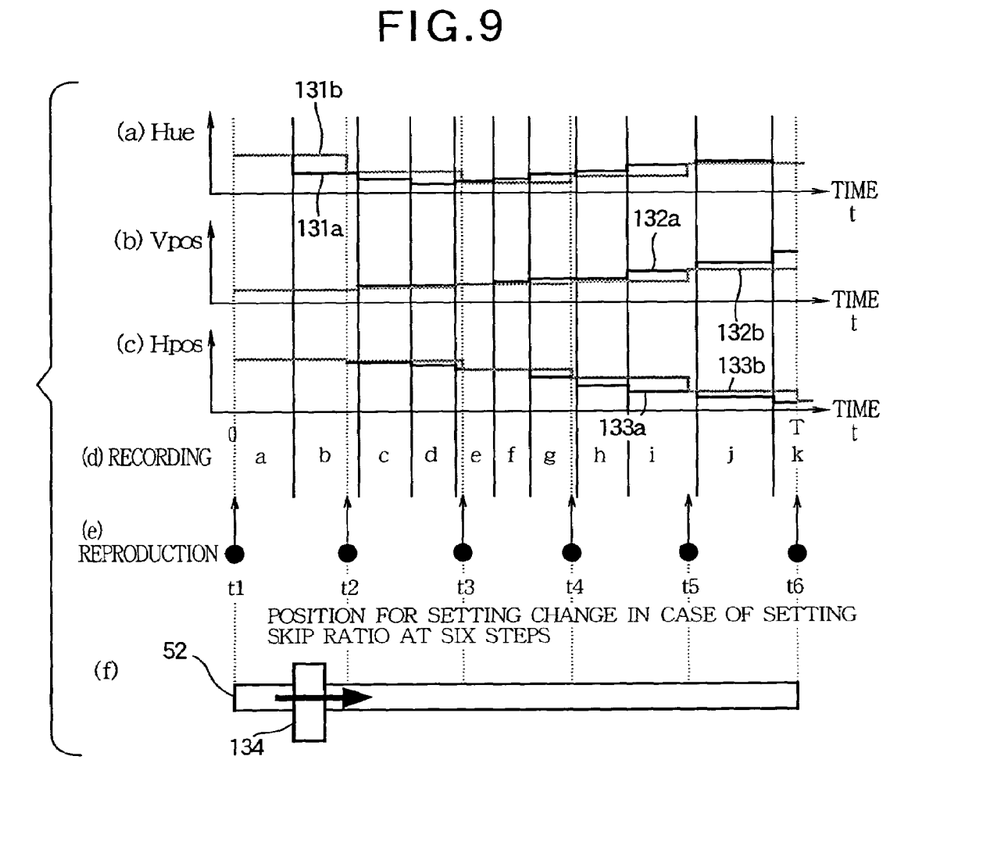
FIG. 9 shows a specific example of sequence data for use in achieving the visual effect shown in FIG. 8.

FIG. 9 shows a specific example of sequence data for use in achieving the visual effect shown in FIG. 8.

In FIGS. 9(*a*) to 9(*c*), "Hue" represents hue control parameters set with the hue control volume (Hue) 34, "Vpos" represents vertical position parameters set with the vertical position volume 42, and "Hpos" represents horizontal position parameters set with the horizontal position volume 44, respectively. These charts are just for purposes of illustration and may not precisely correspond to the screen of FIG. 8.

The recording of the sequence data is started at time t=1 and ended at time t=T. During this time progress, the hue control parameters Hue are recorded in memory as indicated with 131*a* through the operation of the hue control volume Hue 34, the vertical position parameters Vpos are recorded in memory as indicated with 132*a* through the operation of the vertical position volume 42, and the horizontal parameters Hpos are recorded in memory as indicated with 133*a* through the operation of the horizontal position volume 44.

This illustrated example shows the case where these kinds of parameters change at the same time step by step at multiple discrete timings during the time progress. As a result, as shown in FIG. 9(*d*), it contains "scenes" a to k. In other words, all the variations of the parameters 131*a* to 133*a* are recorded with keeping each parameter at a constant value in each "scene."

When the sequence data thus recorded is reproduced, if the automatic play switch 59 is operated for automatic reproduction, the recorded sequence data has simply to be read at constant speed according to the time progress. As a result, the picture signals inputted are applied with a visual effect according to the variations of the stored multiple parameters, and then mixed and outputted.

Here, a description will be made of the case where the human operator operates the assignable fader 52 in FIG. 3 to reproduce the sequence data.

FIG. 9(f) shows the position of a knob 134 of the assignable fader 52, in which the limit of travel of the knob 134 corresponds to the whole span of the time progress of the recorded sequence data. It means that the leftmost position of the knob 134 indicates start timing at which the visual effect application is started and the rightmost position indicates end timing at which the visual effect application is ended.

Here, the sequence data is reproduced at six steps with the skip ratio switch 51 in FIG. 3. In this case, the time period t=0 to T is divided into five parts to set timings t1, t2, ..., t6. The human operator manually operates the operator's knob 134 to read the parameter values 131a to 133a of the sequence data at these timings t1, t2, ..., t6, respectively.

As a result, parameter values as indicated with 131b to 133b are read out. It means that the recorded parameters may not be always read out at the same timings as they were recorded, and in some cases, they may not be even read out at all.

The above describes the case where all the parameter values 131a to 133a are changed discretely at the same timings during the recording of the sequence data, but they may be changed at different timings. Further, the recording timings may be set at constant intervals.

Figure 10:
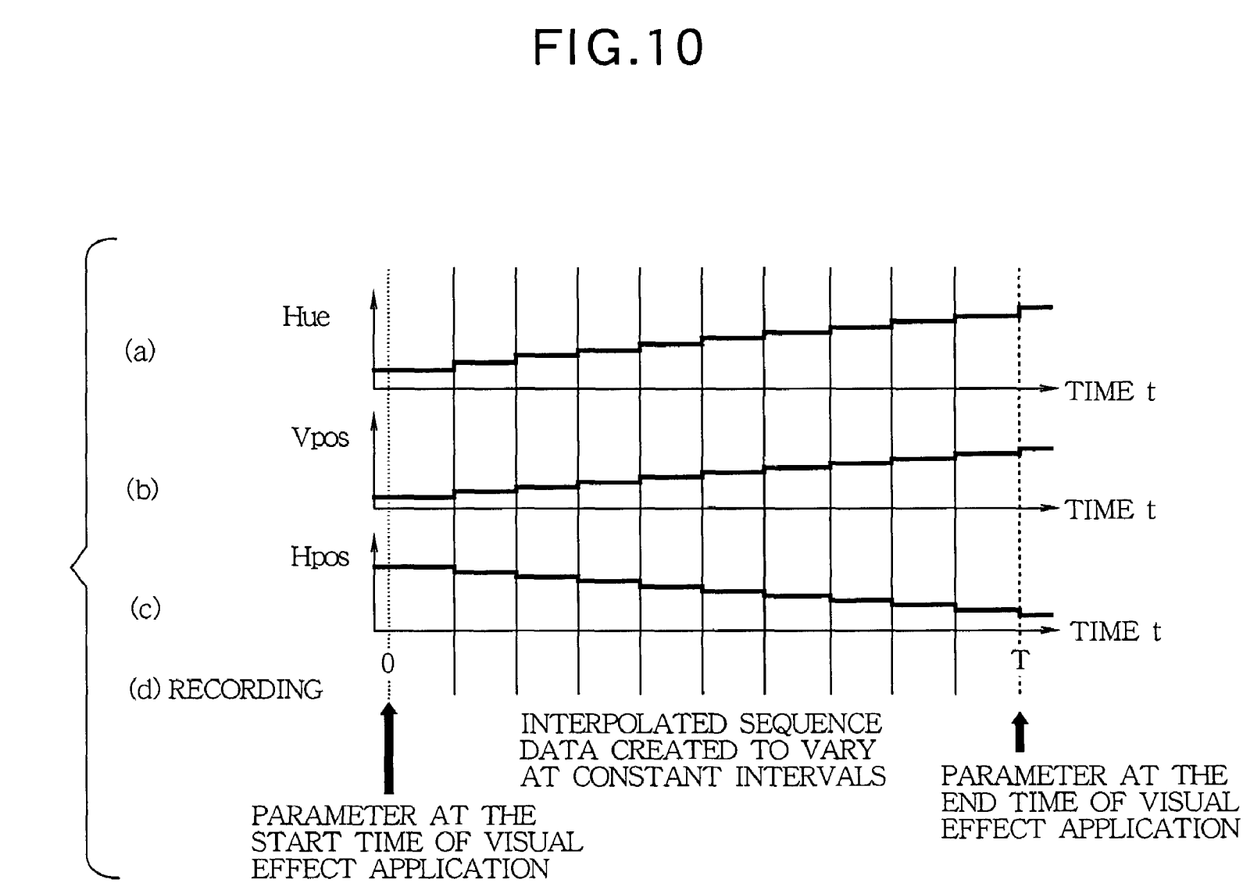
FIG. 10 shows explanatory charts showing interpolated sequence data.

FIG. 10 shows explanatory charts showing interpolated sequence data.

A description will be made of the case where parameter values at the start time of visual effect application and parameter values at the end time of the visual effect application have been recorded as sequence data.

In this case, parameter values at some midpoint in the time progress are interpolated, for example, by a linear interpolation method. As a result, all the parameter values between the start point and the end point can be connected smoothly. The parameter values after subjected to linear interpolation are indicated in the chart. In the illustrated example, the period of visual effect application is divided into ten intervals.

The number of divided intervals can also be controlled to vary the roughness or fineness of the visual effect.

The parameter values thus created may be automatically reproduced with the push of the automatic play switch 59 in FIG. 3, or read out by manually operating the knob 134 of the assignable fader 52 in the same manner as in FIG. 9.

Although the above description with reference to FIGS. 8 and 9 was made to show the specific example in which a visual effect is applied to a video signal of one input channel, there is also the case where video signals of multiple input channels are mixed and displayed.

Use of the crossfader 50 in FIG. 3 enables a function to achieve such a scene change as to fade out one picture while fading in the other, but such a scene change is monotonous.

In this case, if the trim volume 33 in FIG. 3 is operated with split-second timing during the scene change with the cross fader 50, such a scene change to fade out one picture after a momentary rise of brightness can be made. Although it is difficult to perform these operations in real time, if the operations are recorded as sequence data, it is possible to achieve these operations while advancing timing steps at fine intervals, rather than in real time, thereby offering ease of operation.

At the time of switching between two video signals, if images need to be moved as shown in FIG. 8, since the crossfader 50 cannot achieve it, the human operator has to operate other operators manually.

However, since such operators associated with the arrangement of images are common operators, they cannot be operated without selecting one channel. Even if an operator associated with the arrangement of an image was provided for each channel, it would be very difficult to operate two channel operators at the same time. Even in this case, use of the sequence control features makes it easy to achieve the movement of images.

First of all, the center position of an image of input channel 1 is moved from the center to the left end, and its sequence data is recorded in memory. Then, the center position of another image of input channel 2 is moved from the right end to the center, and its sequence data is recorded in memory. In other words, overdubbing is done.

Automatic reproduction of these sequence data or manual reproduction of them in the manner shown in FIG. 8 enables the function to change scenes between the screen image created by a video signal of input channel 1 and the screen image created by a video signal of input channel 2 while gradually moving the screen images side by side in the horizontal direction of the full screen.

It is apparent from the above description that the present invention has the advantage of making it easy to vary with time a visual effect applied with the operation of operators.

Further, it has a high degree of flexibility in varying an applicable visual effect with time, and can set even a complicated visual effect.

What is claimed is:

1. An apparatus for inputting a video signal representative of a picture from a plurality of input channels, processing the video signal to apply a visual effect to the picture, and outputting the processed video signal to an output channel, the apparatus comprising:

a parameter value setting section that includes a plurality of operators manually operable to set a plurality of parameter values used for applying a desired visual effect to the picture;

a sequence control section having a memory for pre-storing a variation of a parameter value settable by one of the operators for a given time interval, said sequence control section sequentially reads out the parameter value from the memory when a reproduction of the video signal is requested, wherein said sequence control section reads out the parameter value in accordance with time progress of the reproduction of the video signal in order to vary with time the visual effect applied to the picture, and then sequentially feeds the read parameter to the video signal processing section; and a video signal processing section that processes the video signal inputted from at least one of the input channels according to the plurality of the parameter values, including the parameter value fed from the sequence control section, wherein the operators include a skip operator that is operated to specify a time interval of updating the parameter values, so that the sequence control section sequentially updates the parameter values stepwise at the time interval specified by the skip operator.

2. The apparatus according to claim 1, wherein the operators include a manual progression operator manually operable to input a desired operation amount in association with variation of the visual effect, so that the sequence control section controls the sequential feeding of the parameter values in response to the operation amount of the manual progression operator.

3. The apparatus according to claim 1, wherein the parameter value setting section has a plurality of operators in correspondence to a plurality of video signals inputted from a plurality of input channels and sets corresponding parameter values for the corresponding video signals by the corresponding operators, the sequence control section sequentially feeds the corresponding parameter values for the corresponding video signals, and the video signal processing section processes the corresponding video signals according to the corresponding parameter values which are either set by the corresponding operators or fed from the sequence control section, and wherein the sequence control section uses the memory for memorizing the corresponding parameter values set by operating the corresponding operators one by one, and sequentially reads out the memorized parameter values in accordance with the time progress.

4. The apparatus according to claim 1, wherein the operators are provided in correspondence to the input channels for individually setting the respective parameter values of the video signals inputted from the respective input channels.

5. The apparatus according to claim 1, wherein the video signal processing section processes a plurality of video signals inputted from the plurality of the input channels, and outputs the processed video signals to the output channel.

6. A method of inputting a video signal representative of a picture from a plurality of input channels, then processing the video signal to apply a visual effect to the picture, and outputting the processed video signal to an output channel, the method comprising the steps of:

operating a plurality of operators to set a plurality of parameter values used for applying a desired visual effect to the picture;

storing to a memory the set parameter values;

sequentially reading out the stored parameter values from the memory when a reproduction of the video signal is requested;

sequentially feeding the read parameter values in accordance with time progress of processing the video signal in order to vary with time the visual effect applied to the picture;

processing the video signal inputted from at least one of the input channels according to either of the parameter values set by the operators or the sequentially fed parameter values; and operating at least one of the plurality of operators to specify a time interval of updating the parameter values so as to cause sequential updating of the parameter values stepwise at the time interval specified.

7. A program for use in an apparatus having a plurality of operators and a processor for inputting a video signal representative of a picture from a plurality of input channels, then processing the video signal to apply a visual effect to the picture, and outputting the processed video signal to an output channel, the program being executable by the processor for causing the apparatus to perform a method comprising the steps of:

in response to the operation of the plurality of operators, setting a plurality of parameter values used for applying a desired visual effect to the picture;

storing to a memory the set parameter values;

sequentially reading out the stored parameter values from the memory when a reproduction of the video signal is requested;

sequentially feeding the read parameter values in accordance with time progress of processing the video signal in order to vary with time the visual effect applied to the picture;

processing the video signal inputted from at least one of the input channels according to either of the parameter values set by the operators or the sequentially fed parameter values; and in response to the operation of at least one of the plurality of operators, specifying a time interval of updating the parameter values so as to cause sequential updating of the parameter values stepwise at the time interval specified.

* * * * *